United States Patent [19]

Teichler et al.

[11] Patent Number: 5,289,558
[45] Date of Patent: Feb. 22, 1994

[54] SWITCHING ASSEMBLY FOR GLASS FIBER CABLES OF THE TELECOMMUNICATION AND DATA TECHNOLOGY

[75] Inventors: Heide Teichler; Gerd Richter; Gunter Hegner; Volker Röseler; Lutz Biederstedt, all of Berlin, Fed. Rep. of Germany

[73] Assignee: Krone Aktiengesellshaft, Berlin, Fed. Rep. of Germany

[21] Appl. No.: 955,497

[22] Filed: Oct. 2, 1992

[30] Foreign Application Priority Data

Oct. 5, 1991 [DE] Fed. Rep. of Germany ....... 4133375

[51] Int. Cl.$^5$ .............................................. G02B 6/36
[52] U.S. Cl. ....................................... 385/135; 174/50
[58] Field of Search .................... 385/59, 71, 134, 135; 174/50, 50.51, 50.52, 50.6

[56] References Cited

U.S. PATENT DOCUMENTS 5,187,766  2/1993  Finzel et al. ........................ 385/135

FOREIGN PATENT DOCUMENTS

3743632A1  12/1987  Fed. Rep. of Germany .
3838428A1  11/1988  Fed. Rep. of Germany .
1-102406   4/1989  Japan ................................. 385/135

OTHER PUBLICATIONS

Kunze Telcom Report vol. 10, Mar. 1987 pp. 27 to 32.

Primary Examiner—John D. Lee
Assistant Examiner—John Ngo
Attorney, Agent, or Firm—McGlew and Tuttle

[57] ABSTRACT

The invention relates to a switching assembly for glass fiber cables of the telecommunication and data technology field, and in particular to a glass fiber cable partitioning and terminal rack. The rack 1 includes a frame 3 supported by the rack 1. The frame 3 includes a jumper field 29 for glass fiber cable cores 8, 9 and at least one magazine 16 or 17 provided with slide-in openings 18 for splice cassettes 19. In similar prior art switching assemblies of this type, there is poor accessibility to the incoming and outgoing glass fiber cable cores 8, 9, thereby a high risk of breakage occurs during assembly, in particular when splicing. For avoiding these disadvantages, the invention provides that the frame 3 is supported at the rack 1 pivotally about a vertical axis 26, and that at the frame 3, a jumper field 29 with a patch field 6, 7 for the incoming and outgoing glass fiber cable cores 8,9 is accessible from the front 4 and from the back 5 of the frame 3. At least one magazine 16, 17 is provided, and the splice cassette slide-in openings 18 extend substantially parallel to the back 5 of the frame 3 and substantially vertically to the vertical axis 26 thereof on the opposed side of the frame 3.

9 Claims, 4 Drawing Sheets

SWITCHING ASSEMBLY FOR GLASS FIBER CABLES OF THE TELECOMMUNICATION AND DATA TECHNOLOGY

FIELD OF THE INVENTION

The invention relates to a switching assembly for glass fiber cables of the telecommunication and data technology art, and in particular to a glass fiber cable partitioning and terminal rack. The rack includes a frame supported by the rack. The rack has a jumper field for the glass fiber cable cores and with at least one magazine provided with slide-in openings for splice cassettes.

BACKGROUND OF THE INVENTION

Similar switching assemblies of the aforementioned species allow the separation, for measurement purposes, of a plug connection between incoming and outgoing glass fiber cable cores. These incoming and outgoing glass fiber cable cores have to be easily accessible and have to be cross-connectable, i.e. connected in any desired manner. The switching assemblies serve, in particular, for the local fiber-glass network (overlay network) of the respective telephone companies.

A similar switching assembly of the aforementioned species is known in the art from "telcom report", vol. 10, March 1987, pages 27 to 32. Such a switching assembly is a glass fiber cable terminal rack has 60 plug connections provided in a central patch field. The glass fiber cable plug connectors are pre-assembled, in the factory, as so-called pigtails (plug connector with glass fiber cable core), which have to welded at the installation site to the glass fiber cable cores. For this purpose, in the lower section of the terminal rack, a magazine provided with slide-in openings for splice cassette is disposed. The magazine is adapted to be flapped out from the frame supported at the rack in a direction towards front, so to remove the splice cassettes. Further, as a switching assembly, a glass fiber cable partitioning rack is known in the art, which comprises three opposed splice fields, i.e. magazines provided with slide-in openings for splice cassettes. In the upper magazine of which are the cores of the interoffice cables, in the central magazine of which are the cores of the internal cables of the exchange office and in the lower magazine of which the cores of the subscribers' cables are supported.

The connections between the various glass fiber cable cores are established by switching wires. In both embodiments, 10 splice cassettes of each splice field are combined to a magazine which is located on a flap-out arm, from which the magazine can be taken out and wired at the work table.

The switching assemblies for glass fiber cables of the telecommunication and data technology described above have the disadvantage that there is relatively poor accessibility to the incoming and outgoing glass fiber cable cores, the risk of breakage, in particular when splicing, being high.

SUMMARY AND OBJECTS OF THE INVENTION

It is therefore the object of the invention to improve the switching assembly for glass fiber cable of the telecommunication and data technology such that handling is substantially easier, so that there is only a low risk that individual glass fiber cable cores are damaged, and that in particular the fiber bundle of the main glass fiber cable will not be broken.

The solution of this object is achieved, according to the invention, by the frame being pivotally supported at the rack about a vertical axis. At the frame, a jumper field with a patch field for the incoming and outgoing glass fiber cable cores is accessible from the front and from the back of the frame. On the front and/or back of the frame, at least one magazine is provided, having splice cassette slide-in openings. These slide-in openings extend substantially parallel to the back of the frame and substantially vertically to the vertical axis thereof on the opposed side of the frame. In the switching assembly according to the invention, the individual glass fiber cable cores are received in splice cassettes which are secured, when the frame is flapped-in, behind the back thereof and which, after flapping the frame out, the splice cassettes are pivoted by approximately 90° towards front, so that all slide-in openings of the magazine show towards the front, and an easy removal of the splice cassettes towards front is possible. Simultaneously, the jumper field with a patch field being accessible from the front and from the back of the frame is disposed, and to which the incoming and outgoing glass fiber cable cores are connected as pigtails (plug connector with glass fiber cable core), over couplings. In the switching assembly according to the invention, there is, therefore, an easy accessibility to the incoming and outgoing glass fiber cable cores at the patch field as well as at the magazine for receiving the splice cassettes. In this way the risk of breakage of the glass fiber cable cores during assembly, e.g. when splicing, is extremely low. The considerably simpler handling of all glass fiber cores reduces the risk of breakage of individual fiber bundles of the main glass fiber cable to a minimum.

The frame can be made of two lateral spars. The jumper field, the magazine and other elements such as a termination field for electric wires can be made in modular form to fit between the spars of the frame. This gives the switching assembly a degree of customization which makes it very versatile. The spars can also be formed to provide guides for the cables and the frame or the individual modules themselves can have reorientation means for receiving and directing the lines. A termination field can also be added to connect electrical lines to the front and back of the frame.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DETAILED DESCRIPTION OF THE PREFERRED EMBODIMENT

The glass fiber cable partitioning and terminal rack forms a switching assembly for glass fiber cables used in telecommunication and data technology. A rack 1 includes several bays having identical widths and each of the bays being formed between two vertical struts 2. Frames 3 are pivotally supported about a lateral vertical axis 26 in each of the bays. The frame is preferably formed of two lateral spars 14. Several transverse struts adapted as support locations are attached between the two lateral spars 14. The remaining sub-assemblies of the switching assembly are adapted as modules, and are also attached between the spars 14. Thereby, any desired configurations can be plugged together. A configuration is described as follows.

Figure 1:
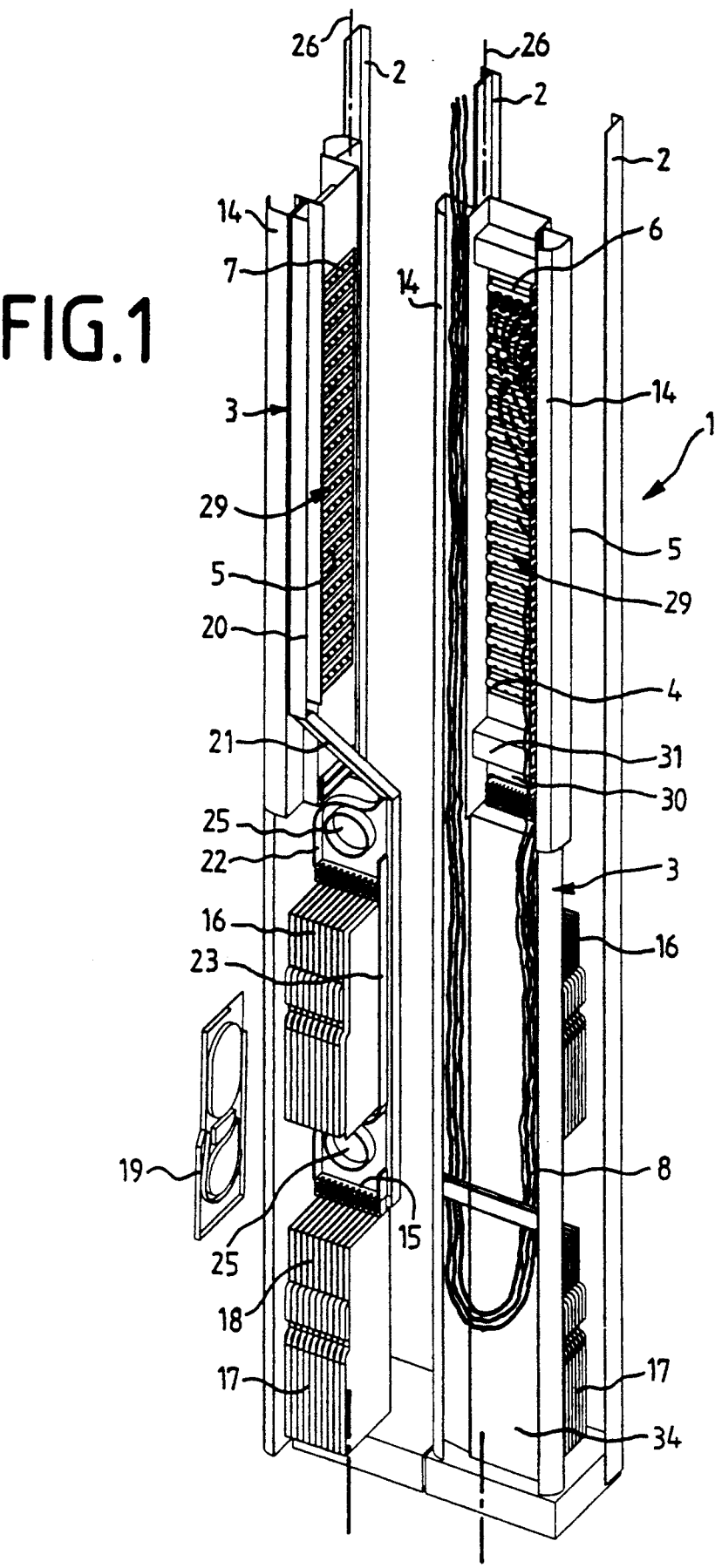
FIG. 1 the glass fiber cable partitioning and terminal rack in a perspective view, on the right in closed and on the left in flapped-open condition.
Figure 3:
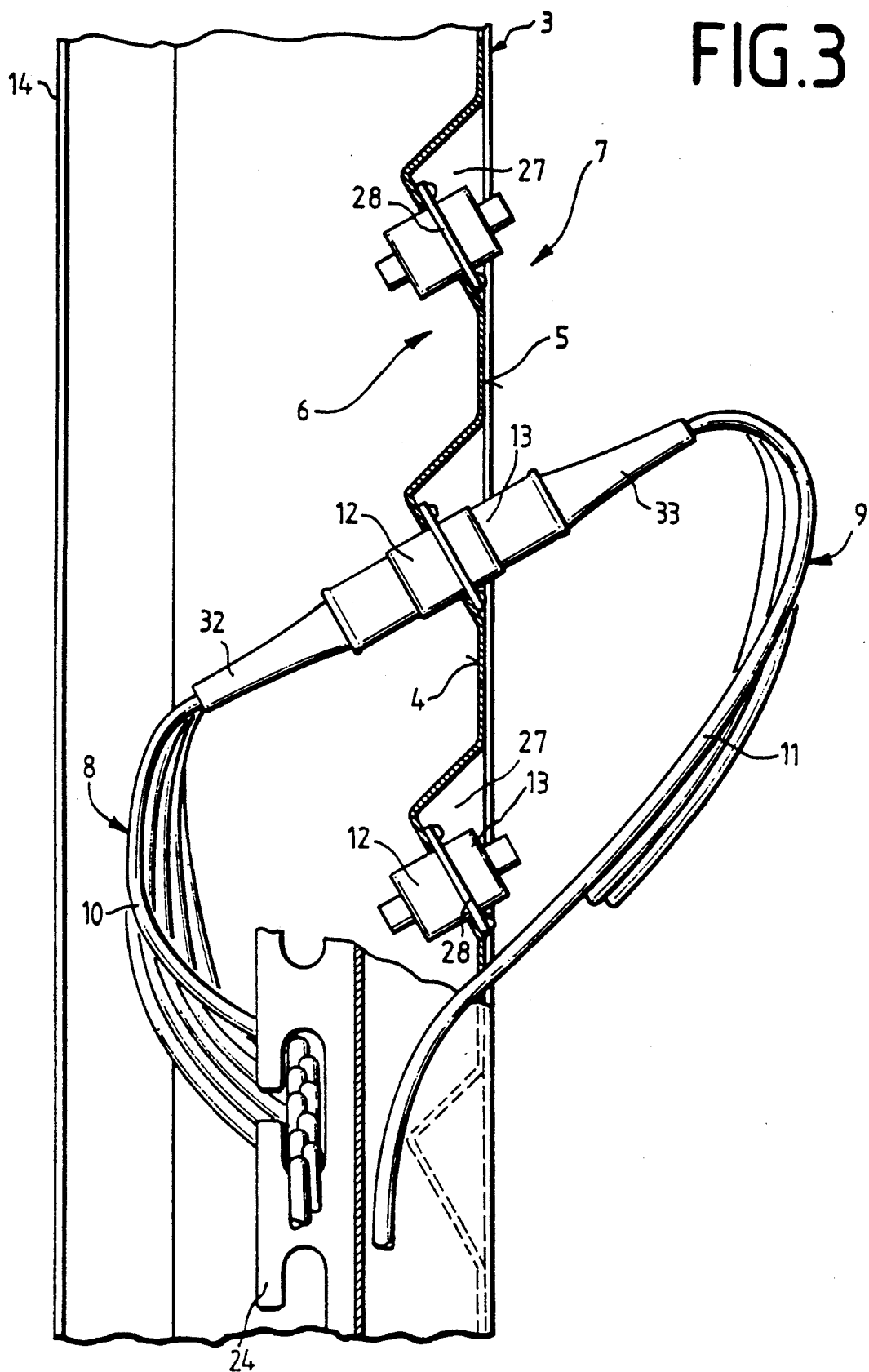
FIG. 3 a vertical section drawn in a enlarged scale through the jumper field.

Each frame 3 includes a jumper field 29 with a patch field 6 and 7 being accessible on its front 4 and on its back 5. The patch fields being for incoming and outgoing glass fiber cable cores 8 and 9, as shown in FIG. 3, which are connected over pigtails 10 and 11 to glass fiber cable core couplings 12 and 13. The glass fiber cable core couplings 12 and 13 form an information link between the glass fiber cable cores on the front of the frame and the back of the frame. The pigtails 10, 11 consist each of a plug connector 32 or 33, resp., with a connected glass fiber cable core 8 or 9 resp. The glass fiber cable core couplings 12, 13 are, according to FIG. 3, connected by the patch fields 6, 7 being formed at a support plate 28 provided in recesses having a triangular cross-section. The front 4 of the frame 3 is closed underneath the front patch field 6, and is provided with lateral spars 14 extending over the full vertical length of the frame 3. The spars 14 are adapted such that therebetween, over-lengths of the exchange cable, or first set of lines, can be guided and received, as is shown on the right-side of FIG. 1.

On the back 5 of the frame 3, underneath the patch field 7, two magazines 16, 17 are attached. Slide-in openings 18 for splice cassettes 19 extend substantially parallel to the back 5 of the frame and also substantially vertical to the vertical axes 26 thereof on the opposite side of the frame 3. Each magazine 16, 17 receives several splice cassettes 19, which are shown, in FIGS. 1 and 2, in a slide-in position and in a slide-in direction outside the respective magazine 16, 17. Guides 20 and 24 and reorientation devices 25 for the glass fiber cable cores 8, 9 are present. These guides extend between the splice cassettes 19 received in the magazines 16, 17 and the patch fields 6, 7. As is shown on the right-hand side of FIG. 1, in the closed condition of the frame 3, only the patch field 6 located on the front 4 and a termination field 30 with terminal blocks 31 for connecting copper wires, if existing, are accessible. In this way only the pigtails 10 of glass fiber cable cores 8 or 9, resp., terminated at glass fiber cable core couplings 12, or the non-shown copper wires can be handled. In the open position, as shown on the left-hand side of FIG. 1, frame 3 is flapped out by approximately 90°. In this open position the patch field 7, located on the back 5 of the frame 3, and the two magazines 16, 17 arranged above each other for splice cassettes 19, are accessible. The splice cassettes can then be removed from the slide-in openings 18 and can be slid back thereinto.

Figure 2:
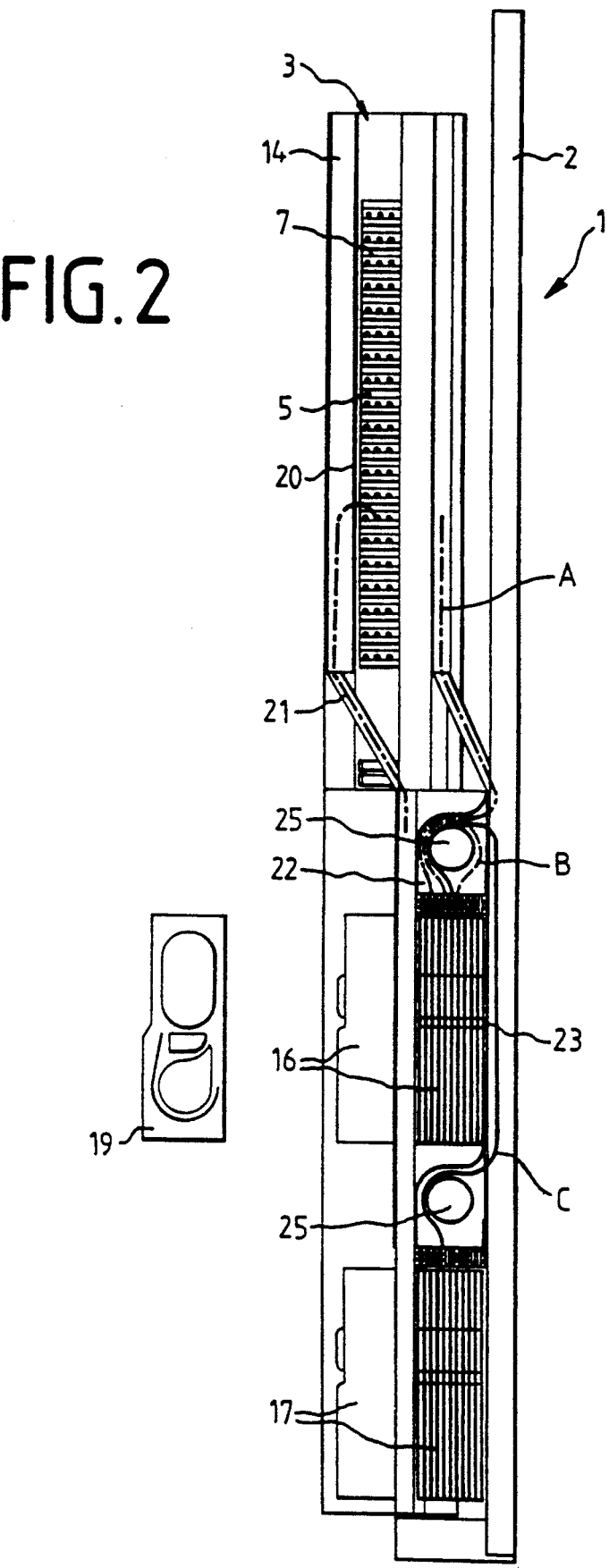
FIG. 2 the glass fiber cable partitioning and terminal rack in a side view, on the right in closed and on the left in flapped-open condition.
Figure 4:
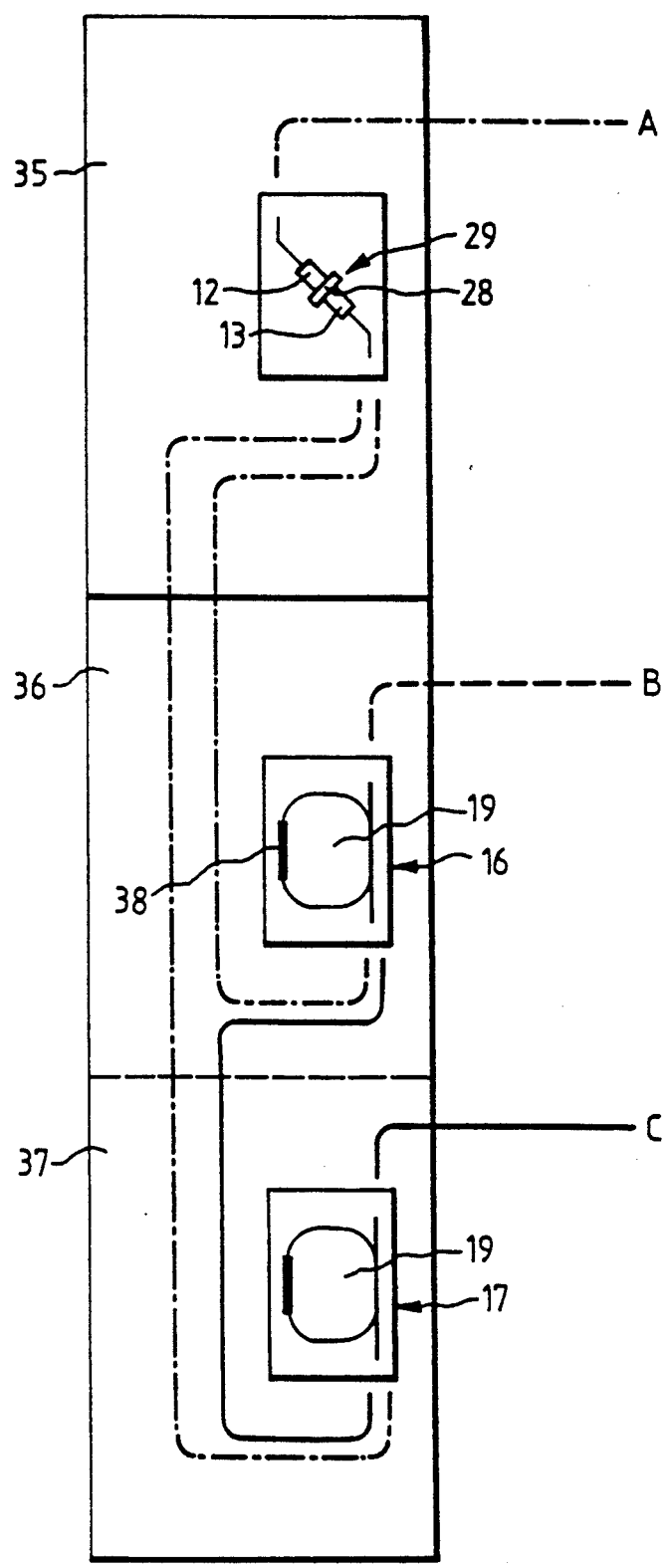
FIG. 4 a schematic representation of the cable guiding.

FIGS. 2 and 4 show the arrangement and the guiding of the first set or exchange office cables, or the first and second set of lines, A terminated in the jumper plane 35 by the couplings 12, 13. The local cables B, which are a subset of a third set of lines, terminate in the upper cassette plane 36 over a splice cassette 19 supported in the magazine 16, and the interoffice cables C, which are also a subset of the third set of lines, terminated in the lower cassette plane 37 over a splice cassette 19 supported in the magazine 17. The glass fiber cables of the third set of lines are connected in the splice cassettes 19, over splices 38, with either the second set of lines or with a fourth set of lines that lead to other splice cassettes 19. Exchange office cables A are conducted from the jumper plane 35 to the upper cassette plane 36 as well as to the lower cassette plane 37, i.e. from the jumper plane 35 to the interoffice plane in the lower cassette plane 37.

What is claimed is:

1. A switching assembly for a plurality of lines, the assembly comprising:

a strut;

a frame including pivot means for pivotably connecting said frame to said strut, said frame having a front side and a back side, and said pivot means pivoting said frame on said strut to expose said front side and said back side, and said pivoting of said frame causing said front side and said back side to be accessible;

a jumper field incorporated into said frame, said jumper field including a plurality of coupling means for connecting a first set of the plurality of lines to said front of said frame and for connecting a second set of a the plurality of lines to said back side of said frame, said coupling means forming a connection between the first set of the plurality of lines and the second set of the plurality of lines; and magazine means for holding a plurality of splice cassette means, said magazine means being attached to said back of said frame and defining a plurality of slide-in openings for receiving said plurality of splice cassette means, each of said plurality of splice cassette means connecting one of a third set of the plurality of lines to a line selected from the group consisting of the second set of the plurality of lines and a fourth set of the plurality of lines, said fourth set of the plurality of lines connecting to other individual splice cassette means.

2. An assembly in accordance with claim 1, wherein:
   said each of said plurality of splice cassette means is removable from said magazine means, and the lines of said each of said plurality of splice cassette means are connectable and disconnectable when said each of said plurality of splice connect means is removed from said magazine means.

3. An assembly in accordance with claim 1, wherein:
   each of said coupling means forms an information link between one line of the first set of the plurality of lines and a predetermined line of the second set of plurality of lines.

4. An assembly in accordance with claim 1, wherein:
   said strut is substantially vertical and stationary;
   said pivot means pivots said frame about a substantially vertical axis of said strut;
   the plurality of lines are fiber optic lines;
   said jumper field has a front patch field accessible on said front of said frame for the first set of lines, and a back patch field accessible on said back of said frame for the second set of lines;
   said magazine means holds said plurality of splice cassette means substantially parallel to said frame and substantially vertical with said substantially vertical axis; and said splice cassette means has means for sliding in and out of said magazine means without disconnecting said connection between the lines.

5. An assembly in accordance with claim 4, further comprising:

electrical termination field means incorporated into said frame, and for connecting and accessing a first set of electrical lines on said front of said frame, said electrical termination field means being also for accessing and connecting a second set of electrical lines on said back of said frame.

6. An assembly in accordance with claim 4, wherein: one of said two spars provide means for receiving and guiding overlengths of the first set of the plurality of lines, said means for receiving guiding being below said jumper field.

7. An assembly in accordance with claim 4, wherein: said jumper field angularly positions each of said coupling means at a spaced angular distance from a vertical plane; and said coupling means includes means for connecting with plug connectors of pigtails of the first and second set of the plurality of lines.

8. An assembly in accordance with claim 1, wherein:

said jumper field and said magazine means are modular; and said frame has spar means for receiving said modular jumper field and said modular magazine means between two lateral spars.

9. An assembly in accordance with claim 1, wherein:

said magazine means is positioned transversely to a support attached substantially vertically to said back of said frame, said support including line guides and a line reorientation means for supporting and directing one of said second and said fourth set of lines.

* * * * *

UNITED STATES PATENT AND TRADEMARK OFFICE
CERTIFICATE OF CORRECTION

PATENT NO. : 5,289,558
DATED : February 22, 1994
INVENTOR(S) : Teichler et al

It is certified that error appears in the above-identified patent and that said Letters Patent is hereby corrected as shown below:

On the title page of the above identified U.S. Letters Patent, please correct the spelling of the Assignee in item 73 as follows:

[73] Assignee: Krone Aktiengesellschaft, Berlin, Federal Republic of Germany

Signed and Sealed this

Seventeenth Day of January, 1995

Attest:

BRUCE LEHMAN

Attesting Officer

Commissioner of Patents and Trademarks